United States Patent
Yoshizaki et al.

(10) Patent No.: US 9,387,925 B2
(45) Date of Patent: Jul. 12, 2016

(54) VIBRATION REDUCTION DEVICE AND VIBRATION REDUCTION METHOD

(75) Inventors: Yuji Yoshizaki, Tokyo (JP); Hidetoshi Suzuki, Tokyo (JP); Hiroshi Ito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 890 days.

(21) Appl. No.: 13/579,150

(22) PCT Filed: Feb. 11, 2011

(86) PCT No.: PCT/JP2011/052957
§ 371 (c)(1),
(2), (4) Date: Sep. 24, 2012

(87) PCT Pub. No.: WO2011/102304
PCT Pub. Date: Aug. 25, 2011

(65) Prior Publication Data
US 2013/0011260 A1 Jan. 10, 2013

(30) Foreign Application Priority Data

Feb. 17, 2010 (JP) ................................. 2010-032808

(51) Int. Cl.
*B64C 27/51* (2006.01)
*B64C 27/00* (2006.01)
*F16F 7/10* (2006.01)

(52) U.S. Cl.
CPC ............. *B64C 27/001* (2013.01); *F16F 7/1005* (2013.01); *B64C 2027/005* (2013.01); *F16F 2224/0283* (2013.01)

(58) Field of Classification Search
CPC ........... F01D 5/10; F01D 25/04; F01D 25/06; F01D 2260/96; B64C 11/008; B64C 27/001; B64C 2027/005; F16F 15/145; F16F 7/104

USPC ............ 416/500; 244/17.11, 17.13; 188/378, 188/379, 380; 267/140.11, 140.13, 140.14
See application file for complete search history.

(56) References Cited

U.S. PATENT DOCUMENTS

| | | | | |
|---|---|---|---|---|
| 4,724,923 | A | * | 2/1988 | Waterman ............... F16F 15/03 181/208 |
| 5,906,254 | A | | 5/1999 | Schmidt et al. |
| 7,331,235 | B2 | * | 2/2008 | Aubourg ............... B64C 27/001 244/17.13 |

(Continued)

FOREIGN PATENT DOCUMENTS

| | | |
|---|---|---|
| JP | 6-74294 | 3/1994 |
| JP | 8-159212 | 6/1996 |

(Continued)

OTHER PUBLICATIONS

M. R. Smith, et al., "Results From the Dynamically Tailored Airframe Structures Program", American Helicopter Society 58th Annual Forum, Montreal, Canada, Jun. 2002.

(Continued)

*Primary Examiner* — Benjamin P Lee
(74) *Attorney, Agent, or Firm* — Wenderoth, Lind & Ponack, L.L.P.

(57) ABSTRACT

A vibration reduction device includes: an elastic body; a dynamic mass; and a controllable mass. The dynamic mass is supported by an object of vibration reduction through the elastic body. An actuator causes the controllable mass to move with respect to the dynamic mass. Such a vibration reduction device can vary the frequency and the amplitude at which the dynamic mass vibrates with respect to the object of vibration reduction by causing the controllable mass to move appropriately with respect to the dynamic mass, thereby enabling vibration of the object of vibration reduction to be reduced more reliably. In addition, such a vibration reduction device can reduce vibration of a certain frequency of the object of vibration reduction even when the controllable mass is fixed with respect to the dynamic mass.

10 Claims, 4 Drawing Sheets

(56) References Cited

U.S. PATENT DOCUMENTS

| | | | |
|---|---|---|---|
| 7,370,829 B2* | 5/2008 | Badre-Alam | B64C 27/001 180/312 |
| 8,164,737 B2* | 4/2012 | Butler | G03F 7/70883 188/378 |
| 8,413,923 B2* | 4/2013 | Brenner | B64C 27/001 244/17.11 |
| 8,499,907 B2* | 8/2013 | Smith | B64C 27/001 188/316 |
| 8,695,917 B2* | 4/2014 | Cranga | B64C 27/001 188/379 |
| 8,899,928 B2* | 12/2014 | Girard | B64C 27/001 416/144 |
| 2006/0151272 A1 | 7/2006 | Smith et al. | |
| 2009/0321556 A1 | 12/2009 | Pancotti et al. | |

FOREIGN PATENT DOCUMENTS

| | | |
|---|---|---|
| JP | 8-312460 | 11/1996 |
| JP | 2000-16395 | 1/2000 |
| JP | 2000-027934 | 1/2000 |
| JP | 2004-165416 | 6/2004 |
| JP | 2004-345525 | 12/2004 |
| JP | 2007-15681 | 1/2007 |
| JP | 2007-223444 | 9/2007 |
| JP | 2009-130354 | 6/2009 |
| JP | 2009-138893 | 6/2009 |
| WO | 92/20482 | 11/1992 |
| WO | 2004/111489 | 12/2004 |
| WO | 2008/060681 | 5/2008 |

OTHER PUBLICATIONS

Machine Translation of JP 2009-138893 having a publication date of Jun. 25, 2009.
Machine Translation of JP 2004-165416 having a publication date of Jun. 10, 2004.
Machine Translation of JP 2007-15681 having a publication date of Jan. 25, 2007.
Machine Translation of JP 8-312460 having a publication date of Nov. 26, 1996.
Machine Translation of JP 8-159212 having a publication date of Jun. 21, 1996.
Machine Translation of JP 2000-27934 having a publication date of Jan. 25, 2000.
Machine Translation of JP 2004-345525 having a publication date of Dec. 9, 2004.
International Search Report issued Mar. 8, 2011 in International (PCT) Application No. PCT/JP2011/052957.
Notification of Reasons for Refusal issued Feb. 23, 2011 in corresponding Japanese Patent Application No. 2010-032808.
Notification of Reasons for Refusal issued Oct. 25, 2011 in corresponding Japanese Patent Application No. 2010-032808.
M. R. Smith, et al., "Dynamically Tailored Airframe Structures Program", American Helicopter Society 57th Annual Forum, Washington, DC, May 2001.
Extended European Search Report issued Jun. 24, 2014 in corresponding European Patent Application No. 11744591.6.
International Preliminary Report on Patentability and Written Opinion of the International Searching Authority issued Sep. 18, 2012 in International (PCT) Application No. PCT/JP2011/052957.
Japanese Office Action issued Nov. 26, 2012 in corresponding Japanese Patent Application No. 2011-283304 with partial English translation.
Japanese Decision to Grant a Patent dated Apr. 9, 2013 in corresponding Japanese Patent Application No. 2011-283304 with partial English translation.

* cited by examiner

VIBRATION REDUCTION DEVICE AND VIBRATION REDUCTION METHOD

TECHNICAL FIELD

The present invention relates to a vibration reduction device and a vibration reduction method, and more particularly relates to a vibration reduction device and a vibration reduction method which are used for reducing vibration.

BACKGROUND ART

A helicopter is known, which has a rotor or rotors above a fuselage and can perform upward and downward movement, forward and backward flight, hovering and the like. When the number of rotor blades of the helicopter is N (N is a natural number), the rotor(s) generates the N/Rev vibration. In addition, vibration other than the N/Rev vibration is generated based on influence of the wind that the helicopter receives. The helicopter is desired to be superior in interior comfort and to reduce the vibration propagating to crew in the helicopter.

The specification of the US patent application publication No. US2006/0151272A1 and the literature of "Dynamically tailored airframe structures program" disclose techniques of reducing vibration by moving a liquid mass by an actuator using a piezoelectric device.

CITATION LIST

Patent Literature

[PTL 1] Specification of the US patent application publication No. US2006/0151272A1

Non Patent Literature

[NPL 1] M. R. Smith, R. J. Pascal, M. C. van Schoor, B. P. Masters, C. Blaurock, E. F. Prechtl, J. P. Rodgers, D. S. Friedmann, "Dynamically tailored airframe structures program", American Helicopter Society 57th Annual Forum, 2001

SUMMARY OF INVENTION

An object of the present invention is to provide a vibration reduction device and a vibration reduction method which reduce vibration of an object of vibration reduction more certainly.

Another object of the present invention is to provide a vibration reduction device and a vibration reduction method which make a range of frequencies of vibration which can be reduced to be broadened.

A vibration reduction device according to the present invention includes: an elastic body; a dynamic mass configured to be supported by an object of vibration reduction through the elastic body; a controllable mass; and an actuator configured to cause the controllable mass to move with respect to the dynamic mass. Such a vibration reduction device can change a frequency and an amplitude at which the dynamic mass vibrates with respect to the object of vibration reduction by causing the controllable mass to move appropriately with respect to the dynamic mass, thereby enabling the vibration of the object of vibration reduction to be reduced more reliably. In addition, such a vibration reduction device can reduce vibration of a certain frequency of the object of vibration reduction even when the controllable mass is fixed with respect to the dynamic mass.

The actuator is preferably includes: a piezoelectric element configured to be joined to the dynamic mass and joined to the controllable mass, and a piezo-driver configured to apply a voltage to the piezoelectric element such that the controllable mass moves with respect to the dynamic mass.

The controllable mass is preferably supported by the dynamic mass such that the controllable mass is rotatable around a rotation axis fixed to the dynamic mass. The actuator preferably causes the controllable mass to rotate around the rotation axis.

The vibration reduction device according to the present invention preferably further includes: an acceleration sensor configured to measure acceleration of the object of vibration reduction, and a control device configured to control the actuator based on the acceleration. For example, the actuator is controlled such that a total inertia force in which the controllable mass and the dynamic mass are combined becomes a force which reduces the vibration of the object of vibration reduction.

The vibration reduction device according to the present invention preferably further includes: a rotation speed sensor configured to measure a rotation speed indicating how many times a rotating body provided in the object of vibration reduction rotates per unit time. Here, the control device preferably controls the actuator further based on the rotation speed.

A helicopter according to the present invention preferably includes: a vibration reduction device according to the present invention; and a rotor or rotor(s) configured to generate thrust force by rotating blades.

A vibration reduction method according to the present invention is performed by using a vibration reduction device that includes: an elastic body, a dynamic mass configured to be supported by an object of vibration reduction through the elastic body, a controllable mass, and an actuator configured to cause the controllable mass to move with respect to the dynamic mass. The vibration reduction method according to the present invention includes: measuring acceleration of the object of vibration reduction; and controlling the actuator based on the acceleration. For example, the actuator is controlled such that a total inertia force in which the controllable mass and the dynamic mass are combined becomes a force which reduces the vibration of the object of vibration reduction. Such a vibration reduction method can change a frequency and a amplitude at which the dynamic mass vibrates with respect to the object of vibration reduction by causing the controllable mass to move appropriately with respect to the dynamic mass, thereby enabling the vibration with the wider range of frequency to be reduced. In addition, such a vibration reduction method can reduce vibration of a certain frequency of the object of vibration reduction even when the controllable mass is fixed with respect to the dynamic mass.

The vibration reduction method according to the present invention preferably further includes: measuring a rotation speed indicating how many times a rotating body provided in the object of vibration reduction rotates per unit time. Here, the motion is calculated further based on the rotation speed.

A computer program according to the present invention preferably causes a computer to execute a vibration reduction method according to the present invention.

The vibration reduction device and the vibration reduction method according to the present invention can reduce the vibration of the object of vibration reduction more certainly.

DESCRIPTION OF EMBODIMENTS

Figure 1:
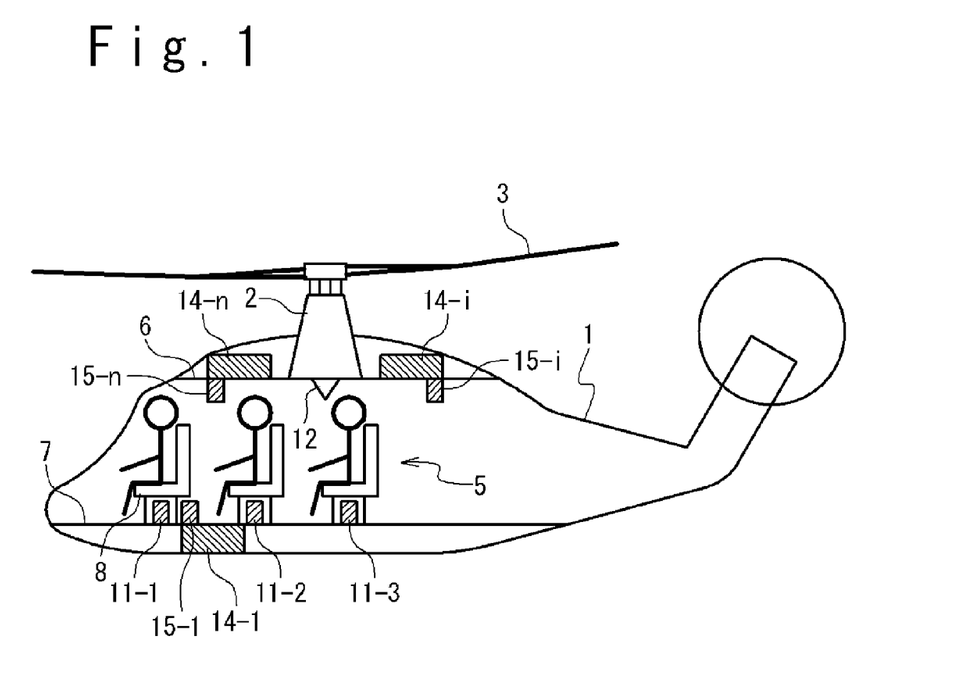
FIG. 1 is a view showing a helicopter according to the present invention.

Embodiments of a helicopter according to the present invention will be described with reference to the accompanying drawings. As shown in FIG. 1, the helicopter is provided with a vibration reduction device on a helicopter body. The helicopter body includes a main body 1; a transmission 2; main rotor blades 3 and a cabin 5. The main body 1 is formed of frames and beams and constitutes a framework of the helicopter. The transmission 2 supports the main rotor blades 3 such that the main rotor blades 3 can rotate with respect to the main body 1. The transmission 2 further transmits rotation power to the main rotor blades 3 from a rotation power source, which is not shown, such that the main rotor blades 3 rotate at a predetermined rotation speed with respect to the main body 1. The main rotor blades 3 include blades. The blades generate lift when the main rotor blades 3 rotate with respect to the main body 1. That is, the main rotor blades 3 generate the thrust force of the helicopter by the rotation with respect to the main body 1.

The cabin 5 is formed as a container shape and includes a cabin ceiling 6, an under-floor structure 7 and a plurality of seats 8. The cabin ceiling 6 is arranged at an upper portion of the cabin 5 and supported by the main body 1. The under-floor structure 7 is arranged at a lower portion of the cabin 5 and supported by the main body 1. The plurality of seats 8 is fixed on the under-floor structure 7 and used for a crew of the helicopter being seated.

Here, vibration generated by the rotation of the main rotor blades 3 is propagated to the main body 1 through the transmission 2, propagated to the cabin 5 through the main body 1, and then propagated to the crew through the seats 8 of the cabin 5.

The vibration reduction device includes a plurality of fuselage acceleration sensors 11-1 to 11-3, a main rotor rotation speed sensor 12, a plurality of vibration reduction elements 14-1 to 14-$n$ (n=1, 2, 3, 4, . . . ) and a plurality of fuselage acceleration sensors 15-1 to 15-$n$. The plurality of fuselage acceleration sensors 11-1 to 11-3 is respectively fixed to a plurality of positions where the plurality of seats 8 is respectively fixed to the under-floor structure 7. Each fuselage acceleration sensor 11-$j$ ($j$=1, 2, 3) of the plurality of fuselage acceleration sensor 11-1 to 11-3 measures acceleration of a portion where the fuselage acceleration sensor 11-$j$ is fixed to the under-floor structure 7.

The main rotor rotation speed sensor 12 measures a rotation speed indicating how many times the main rotor blades 3 rotates per unit time with respect to the main body 1.

The plurality of vibration reduction elements 14-1 to 14-$n$ is respectively fixed to the cabin ceiling 6 or the under-floor structure 7.

The plurality of fuselage acceleration sensors 15-1 to 15-$n$ is respectively fixed to a plurality of positions where the plurality of vibration reduction elements 14-1 to 14-$n$ is respectively fixed to the cabin ceiling 6 or the under-floor structure 7. Each fuselage acceleration sensor 15-$i$ ($i$=1, 2, 3, . . . , n) of the plurality of fuselage acceleration sensors 15-1 to 15-$n$ measures acceleration of a portion where the vibration reduction elements 14-$i$ is fixed to the cabin ceiling 6 or the under-floor structure 7.

Figure 2:
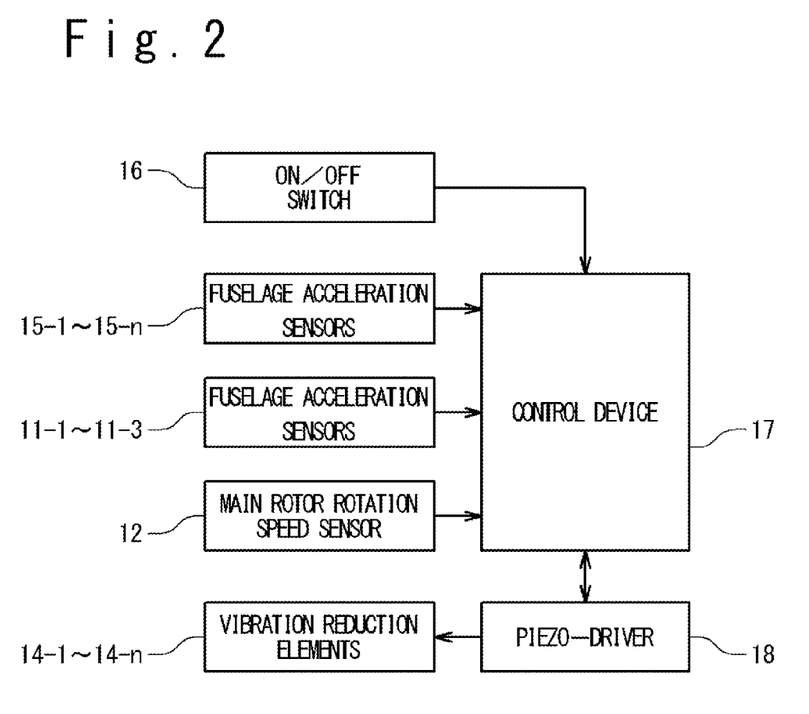
FIG. 2 is a block diagram showing a vibration reduction device according to the present invention.

FIG. 2 shows the vibration reduction device. The vibration reduction device further includes an input device 16, a control device 17 and a piezo-driver 18. The input device 16 is arranged in the cockpit, generates information by user's operation, and outputs the information to the control device 17. For example, the input device 16 selects one of a control ON mode and a control OFF mode by the user's operation and outputs the selected mode to the control device 17. The piezo-driver 18 outputs predetermined electric signals to the plurality of vibration reduction elements 14-1 to 14-$n$ by the control of the control device 17.

The control device 17 is a computer and includes a CPU, a storage device, a removable memory drive and an interface which are not shown. The CPU executes a computer program installed into the control device 17 to control the storage device and the interface. The storage device stores the computer program and temporary stores information created by the CPU. The removable memory drive is used for reading data stored in a recording medium when the recording medium is inserted into the removable memory drive. The removable memory drive is further used for installing a computer program into the control device 17 when a recording medium in which the computer program is recorded is inserted into the removable memory drive. As the recording medium, a flash memory, a magnetic disk (a flexible disk, a hard disk), an optical disk (CD, DVD), and a magnetic optical disk are exemplified. The interface outputs information created by external devices connected with the control device 17 to the CPU, and outputs information created by the CPU to the external devices. The external devices include the plurality of fuselage acceleration sensors 11-1 to 11-3, the plurality of fuselage acceleration sensors 15-1 to 15-$n$, the main rotor rotation speed sensor 12, the input device 16 and the piezo-driver 18.

Figure 3:
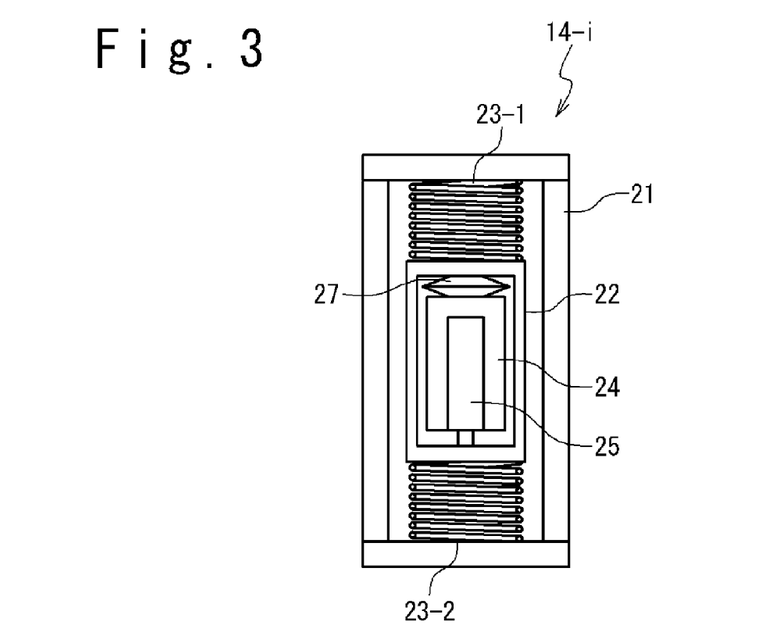
FIG. 3 is a sectional view showing a vibration reduction element.

FIG. 3 shows each of the plurality of vibration reduction elements 14-1 to 14-$n$. Each vibration reduction element 14-$i$ of the plurality of vibration reduction elements 14-1 to 14-$n$ includes a frame 21, a dynamic mass 22, springs 23-1 to 23-2, a controllable mass 24 and a piezo-actuator 25. The frame 21 is fixed to the cabin ceiling 6 or the under-floor structure 7. The dynamic mass 22 is supported by the frame 21 such that the dynamic mass 22 can move in parallel with respect to the frame 21. As mass of the dynamic mass 22, 20 kg is exemplified. The spring 23-1 is formed of an elastic body and applies elastic force to the dynamic mass 22 in a direction parallel to the direction in which the dynamic mass 22 can move in parallel with respect to the frame 21. The spring 23-2 is formed of an elastic body and applies elastic force to the dynamic mass 22 in a direction opposite to the direction of the elastic force applied by the spring 23-1.

The controllable mass 24 is formed of a member in the dynamic mass 22, the member having mass which accounts for about four out of ten of the dynamic mass 22, and supported by the dynamic mass 22 such that the controllable mass 24 can move in parallel with a certain direction. The certain direction which the controllable mass 24 can move in parallel with is parallel to the direction which the dynamic mass 22 can move in parallel with. The piezo-actuator 25 is fixed to the dynamic mass 22 at one end, and fixed to the controllable mass 24 at the other end. The piezo-actuator 25 includes a spring 27. The spring 27 is formed of an elastic body. The spring 27 applies elastic force to the controllable mass 24 such that the piezo-actuator 25 is compressed. The piezo-actuator 25 causes the controllable mass 24 to move in parallel with the certain direction based on the electric signal applied by the piezo-driver 18.

The elastic forces of the springs 23-1 and 23-2 are designed such that a frequency of the vibration of the dynamic mass 22 with respect to the frame 21 coincides with a frequency of the N/rev vibration when the controllable mass 24 is fixed with respect to the dynamic mass 22. The N/rev vibration is a vibration generated by the rotation of the main rotor blades 3. That is, the frequency of the N/rev vibration coincides with the product of an average of the rotation speed of the main rotor blades 3 and the number of blades of the main rotor blades 3.

Figure 4:
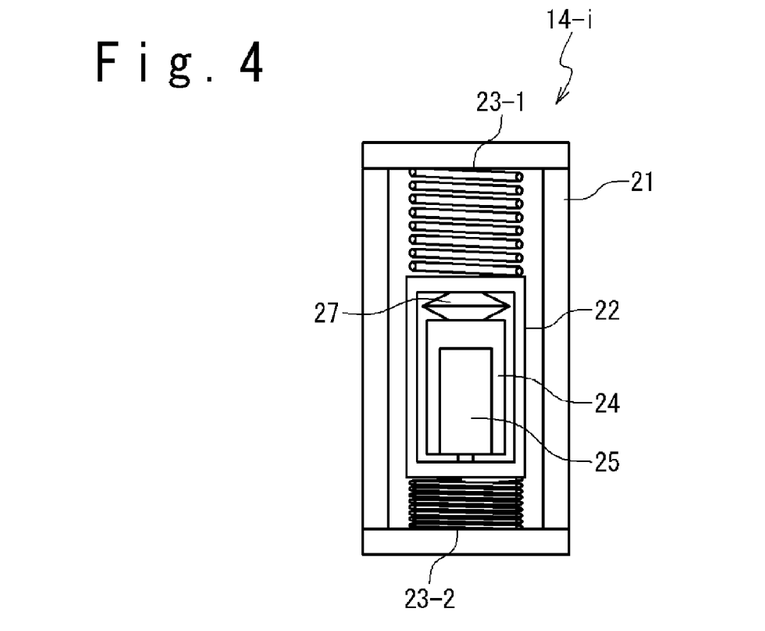
FIG. 4 is a sectional view showing another situation of the vibration reduction element.

FIG. 4 shows a state of the vibration reduction element 14-$i$ when the controllable mass 24 moves with respect to dynamic mass 22. When the controllable mass 24 moves with respect to the dynamic mass 22, force by which the dynamic mass 22 moves in parallel with the frame 21 is applied to the dynamic mass 22 based on reaction against the controllable mass 24. Consequently, by causing the controllable mass 24 to appropriately move with respect to the dynamic mass 22, the dynamic mass 22 can be vibrated at a frequency different from the frequency of the vibration of the dynamic mass 22 when the controllable mass 24 is fixed with respect to the dynamic mass 22. The range of variation of the frequency is exemplified as 3%. In addition, by causing the controllable mass 24 to appropriately move with respect to the dynamic mass 22, the dynamic mass 22 can be vibrated at amplitude different from the amplitude of the vibration of the dynamic mass 22 when the controllable mass 24 is fixed with respect to the dynamic mass 22.

Figure 5:
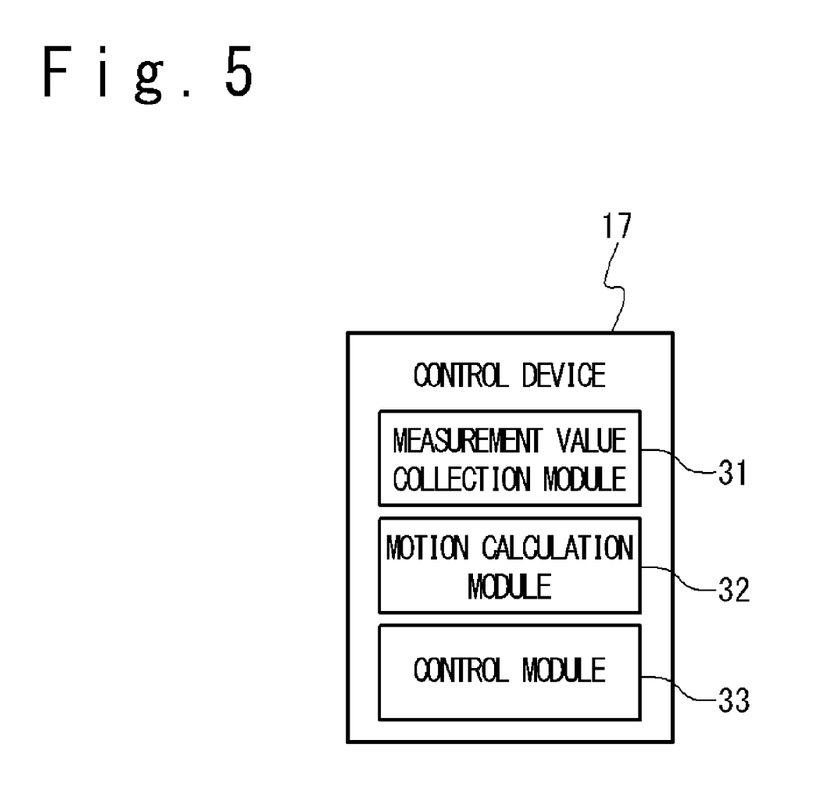
FIG. 5 is a block diagram showing a control device.

The computer program installed in the control device 17 is formed of a plurality of computer programs for achieving a plurality of functions by the control device 17. The plurality of functions is, as shown in FIG. 5, includes a measurement value collection module 31, a motion calculation module 32 and a control module 33.

The measurement value collection module 31 collects measurement values from the plurality of fuselage acceleration sensors 11-1 to 11-3, the plurality of fuselage acceleration sensors 15-1 to 15-$n$, and the main rotor rotation speed sensor 12. The measurement values includes a plurality of acceleration respectively measured by the plurality of fuselage acceleration sensors 11-1 to 11-3, a plurality of acceleration respectively measured by the plurality of fuselage acceleration sensors 15-1 to 15-$n$, and a rotation speed measured by the main rotor rotation speed sensor 12.

The motion calculation module 32 calculates a plurality of inertia force based on the measurement values collected by the measurement value collection module 31. The plurality of inertia force corresponds to the plurality of vibration reduction elements 14-1 to 14-$n$. The inertia force, which corresponds to the vibration reduction element 14-$i$, of the plurality of inertia force is calculated such that vibration of the cabin 5 is reduced when the controllable mass 24 and the dynamic mass 22 of the vibration reduction element 14-$i$ apply the inertia force to the frame 21. The motion calculation module 32 further calculates a plurality of controllable mass motion based on the calculated plurality of inertia force. The plurality of controllable mass motion corresponds to the plurality of vibration reduction elements 14-1 to 14-$n$. The controllable mass motion, which corresponds to the vibration reduction element 14-$i$, of the plurality of controllable mass motion indicates motion that the controllable mass 24 moves with respect to the dynamic mass 22 of the vibration reduction element 14-$i$, and is calculated such that the dynamic mass 22 and the controllable mass 24 apply the calculated inertia force to the frame 21 by the execution of the controllable mass motion by the controllable mass 24.

The control module 33 controls the piezo-driver 18 based on the plurality of controllable mass motion calculated by the motion calculation module 32. Here, the piezo-driver 18 supplies the plurality of electric signals to the piezo-actuators 25 of the plurality of vibration reduction elements 14-1 to 14-$n$ such that the controllable mass 24 of the plurality of vibration reduction elements 14-1 to 14-$n$ respectively executes the plurality of controllable mass motion calculated by the motion calculation module 32.

When a helicopter according to the present invention is newly manufactured, this vibration reduction device is arranged in the helicopter. In addition, the existing helicopter can be improved to be a helicopter according to the present invention by arranging this vibration reduction device.

An embodiment of the vibration reduction method according to the present invention is performed by this vibration reduction. The control device 17 collects measurement values from the plurality of fuselage acceleration sensors 11-1 to 11-3, the plurality of fuselage acceleration sensors 15-1 to 15-$n$, and the main rotor rotation speed sensor 12. The measurement values includes a plurality of acceleration respectively measured by the plurality of fuselage acceleration sensors 11-1 to 11-3, a plurality of acceleration respectively measured by the plurality of fuselage acceleration sensors 15-1 to 15-$n$, and a rotation speed measured by the main rotor rotation speed sensor 12.

The control device 17 calculates a plurality of dynamic mass motion based on the collected measurement values. The plurality of dynamic mass motion corresponds to the plurality of vibration reduction elements 14-1 to 14-$n$. The dynamic mass motion, which corresponds to the vibration reduction element 14-$i$, of the plurality of dynamic mass motion is calculated such that the vibration of the cabin 5 is reduced by the execution of the dynamic mass motion by the dynamic mass 22 of the vibration reduction element 14-$i$. In addition, the control device 17 calculates a plurality of controllable mass motion based on the calculated plurality of dynamic mass motion. The plurality of controllable mass motion corresponds to the plurality of vibration reduction elements 14-1 to 14-$n$. The controllable mass motion, which corresponds to the vibration reduction element 14-$i$, of the plurality of controllable mass motion indicates motion that the controllable mass 24 moves with respect to the dynamic mass 22 of the vibration reduction element 14-$i$, and is calculated such that the dynamic mass 22 executes the calculated dynamic mass motion by the execution of the controllable mass motion by the controllable mass 24.

The control device 17 controls the piezo-driver 18 such that the piezo-driver 18 does not supply electric signals to the piezo-actuators 25, when the control OFF is selected by the input device 16.

The control device 17 controls the piezo-driver 18 based on the calculated plurality of controllable mass motion, when the control ON is selected by the input device 16. Here, the piezo-driver 18 respectively supplies a plurality of electric signals to the piezo-actuators 25 of the plurality of vibration reduction elements 14-1 to 14-$n$ such that the controllable mass 24 of the plurality of vibration reduction elements 14-1 to 14-$n$ respectively executes the calculated plurality of controllable mass motion by the control of the piezo-driver 18 by the control device 17.

When the piezo-driver 18 supplies the electric signal to a piezo-actuator 25 of each vibration reduction element 14-$i$, the piezo-actuators 25 causes the controllable mass 24 to move in parallel with the dynamic mass 22 such that the controllable mass 24 executes the calculated controllable mass motion. The dynamic mass 22 moves with respect to the frame 21 by the inertia force generated by the motion of the controllable mass 24. In a portion where the vibration reduction element 14-$i$ is fixed in the cabin 5, the vibration is reduced by the inertia force generated by the motion of the dynamic mass 22.

The rotation speed of the main rotor blades 3 is fluctuated based on the influence of the wind that the main rotor blades 3 receive. According to this vibration reduction method, the dynamic mass 22 can be caused to vibrate at various frequencies by making the controllable mass 24 appropriately move with respect to the dynamic mass 22. According to this vibration reduction method, even when the frequency of the vibration of the cabin 5 is fluctuated by the fluctuation of the rotation speed of the main rotor blades 3, the vibration of the cabin 5 can be reduced more certainly by making the controllable mass 24 appropriately move with respect to the dynamic mass 22.

Even if the vibration reduction device does not work due to malfunctions or the like, that is, even if the controllable mass 24 is fixed with respect to the dynamic mass 22, the dynamic mass 22 can vibrate at the certain frequency. As a result, this vibration reduction device can reduce the vibration more surely even if the vibration reduction device does not work due to malfunctions or the like.

Incidentally, the piezo-actuator 25 may be replaced with another actuator which causes the controllable mass 24 to move. As the other actuator, an actuator, which includes a super magnetostrictive element that can be transformed based on an applied magnetic field, is exemplified. The vibration reduction device to which this actuator is applied can reduce the vibration more certainly, similarly to the vibration reduction device in the above-described embodiment.

Incidentally, the piezo-actuator 25 may make the controllable mass 24 move through a mechanism. As the mechanism, a link mechanism or a lever is exemplified. The plurality of vibration reduction element to which this mechanism is applied is preferable because a movable range of the controllable mass 24 can be larger than a movable range of the piezo-actuator 25.

Incidentally, the controllable mass 24 may be replaced with another controllable mass which can move differently from the parallel motion. As the other controllable mass, a controllable mass, which is supported such that the controllable mass can perform rotational motion including a component of a direction where the dynamic mass 22 moves, is exemplified. The vibration reduction device to which this controllable mass is applied can reduce the vibration more certainly, similarly to the vibration reduction device in the above-described embodiment.

Incidentally, the dynamic mass 22 may be replaced with another dynamic mass which can move differently from the parallel motion. As the other dynamic mass, a dynamic mass, which is supported by the frame 21 such that the dynamic mass can perform rotational motion, is exemplified. The vibration reduction device to which this dynamic mass is applied can reduce the vibration more certainly, similarly to the vibration reduction device in the above-described embodiment.

Incidentally, if the vibration reduction device can calculate the motion of the controllable mass 24, which can sufficiently reduce the vibration propagated to the crew, based on only acceleration measured by the plurality of fuselage acceleration sensors 11-1 to 11-3 and the plurality of fuselage acceleration sensors 15-1 to 15-$n$, the main rotor rotation speed sensor 12 may be omitted in the vibration reduction device.

Incidentally, if the vibration reduction device can sufficiently reduce the vibration propagated to the crew, only one vibration reduction element may be provided in the helicopter.

This vibration reduction device may be used for vibration reduction in a device other than a helicopter. As the device, a motor vehicle and a washing machine are exemplified.

This application is based upon and claims the benefit of priority from Japanese patent application No. 2010-032808 filed on Feb. 17, 2010, the disclosure of which is incorporated herein in its entirety by reference.

The invention claimed is:

1. A vibration reduction device comprising:
   a frame structure suitable for being coupled to an object of vibration reduction;
   a first elastic body coupled to a first end of said frame structure, said first elastic body being disposed in said frame structure;
   a second elastic body coupled to a second end of said frame structure, said second elastic body being disposed in said frame structure;
   a dynamic mass coupled to said frame structure through said first elastic body and said second elastic body and disposed in said frame structure;
   a third elastic body;
   a controllable mass disposed in said dynamic mass and coupled to said dynamic mass through said third elastic body; and
   an actuator configured to cause said controllable mass to move with respect to said dynamic mass,
   wherein said actuator includes:
   a piezoelectric element configured to cause said controllable mass to move; and
   a piezo-driver configured to apply a voltage to said piezoelectric element such that said controllable mass moves with respect to said dynamic mass, and
   wherein said piezoelectric element is directly or indirectly joined to said controllable mass.

2. The vibration reduction device according to claim 1, wherein said controllable mass is supported by said dynamic mass such that said controllable mass is rotatable around a rotation axis fixed to said dynamic mass, and
   wherein said actuator causes said controllable mass to rotate around said rotation axis.

3. The vibration reduction device according to claim 2, further comprising:
   an acceleration sensor configured to measure an acceleration of said object of vibration reduction; and
   a control device configured to control said actuator based on said acceleration.

4. The vibration reduction device according to claim 2, further comprising:
   a rotation frequency sensor configured to measure a rotation frequency indicating how many times a rotating body provided in said object of vibration reduction rotates per unit time,
   wherein said control device further controls said actuator based on said rotation frequency.

5. A helicopter comprising:
   a vibration reduction device; and
   at least one rotor configured to generate thrust force by rotating blades, wherein said vibration reduction device includes:
   a frame structure suitable for being coupled to an object of vibration reduction;

a first elastic body coupled to a first end of said frame structure, said first elastic body being disposed in said frame structure;
a second elastic body coupled to a second end of said frame structure, said second elastic body being disposed in said frame structure;
a dynamic mass coupled to said frame structure through said first elastic body and said second elastic body and disposed in said frame structure;
a third elastic body;
a controllable mass disposed in said dynamic mass and coupled to said dynamic mass through said third elastic body; and
an actuator configured to cause said controllable mass to move with respect to said dynamic mass,
wherein said actuator includes:
a piezoelectric element configured to cause said controllable mass to move; and
a piezo-driver configured to apply a voltage to said piezoelectric element such that said controllable mass moves with respect to said dynamic mass, and
wherein said piezoelectric element is directly or indirectly joined to said controllable mass.

6. A vibration reduction method, comprising:
providing a vibration reduction device that includes:
a frame structure suitable for being coupled to an object of vibration reduction;
a first elastic body coupled to a first end of said frame structure, said first elastic body being disposed in said frame structure;
a second elastic body coupled to a second end of said frame structure, said second elastic body being disposed in said frame structure;
a dynamic mass coupled to said frame structure through said first elastic body and said second elastic body and disposed in said frame structure;
a third elastic body;
a controllable mass disposed in said dynamic mass and coupled to said dynamic mass through said third elastic body; and
an actuator configured to cause said controllable mass to move with respect to said dynamic mass,
wherein said actuator includes:
a piezoelectric element configured to cause said controllable mass to move; and
a piezo-driver configured to apply a voltage to said piezoelectric element such that said controllable mass moves with respect to said dynamic mass,
measuring an acceleration of said object of vibration reduction; and
controlling said actuator based on said acceleration.

7. The vibration reduction method according to claim 6, further comprising:
measuring a rotation frequency indicating how many times a rotating body provided in said object of vibration reduction rotates per unit time,
wherein said actuator is further controlled based on said rotation frequency.

8. The helicopter according to claim 5, wherein said controllable mass is supported by said dynamic mass such that said controllable mass is rotatable around a rotation axis fixed to said dynamic mass, and
wherein said actuator causes said controllable mass to rotate around said rotation axis.

9. The helicopter according to claim 8, wherein said vibration reduction device further includes:
an acceleration sensor configured to measure an acceleration of said object of vibration reduction, and
a control device configured to control said actuator based on said acceleration.

10. The helicopter according to claim 9, wherein said vibration reduction device further includes:
a rotation frequency sensor configured to measure a rotation frequency indicating how many times a rotating body provided in said object of vibration reduction rotates per unit time,
wherein said control device further controls said actuator based on said rotation frequency.

* * * * *